W. H. VOSS.
POWER TRANSMISSION MECHANISM.
APPLICATION FILED JUNE 11, 1921.

1,438,150.

Patented Dec. 5, 1922.

Witness:
John Enders
Merrill M. Blackburn

Inventor:
William H. Voss,
by Wallace R. Lane.
Atty

Patented Dec. 5, 1922.

1,438,150

UNITED STATES PATENT OFFICE.

WILLIAM H. VOSS, OF DAVENPORT, IOWA.

POWER-TRANSMISSION MECHANISM.

Application filed June 11, 1921. Serial No. 476,730.

*To all whom it may concern:*

Be it known that I, WILLIAM H. VOSS, a citizen of the United States, residing at Davenport, in the county of Scott and State of Iowa, have invented a certain new and useful Improvement in Power-Transmission Mechanism, of which the following is a specification.

Among the objects of my invention are to provide means whereby the full load of the extractor will not be suddenly thrown onto the driving mechanism but will pick up gradually until full speed is acquired; further to provide an automatic brake for stopping the extractor when the driving clutch is thrown out; further to provide means whereby it will be impossible to throw the brake and driving clutch into operation at the same time; and such further objects and advantages as will appear as my invention is more thoroughly understood.

My invention further resides in such combination, construction and arrangement of parts as disclosed in the accompanying drawings, in which while I have illustrated a preferred embodiment thereof, I desire it to be understood that the same is susceptible of modification and change without departing from the spirit of my invention.

Figure 1:
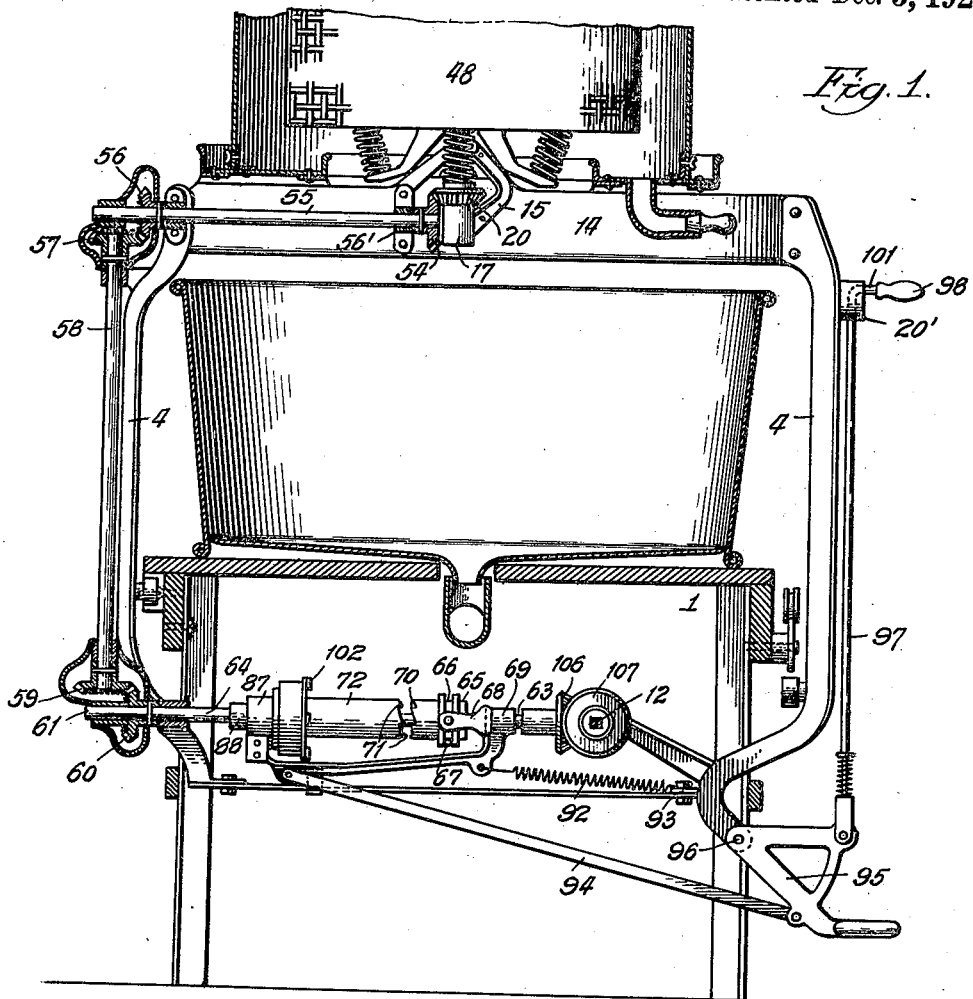
Fig. 1 is a vertical transverse section taken on a plane extending through the center of the extractor.

Referring to the drawings, 1 designates an elongated stand having mounted thereon at one end a washing machine. The washing machine located on the end of the table 1 comprises the usual tub. Extending longitudinally underneath the table 1 is the main drive shaft 12.

Referring to Fig. 1, it will be noted that my improved extractor consists of a frame work or support 4, there being one such support on either side, the upper end of which supports are connected by the rigid cross bar 14 suitably secured thereto by means of screws, bolts, or the like. Rigidly secured to this cross bar 14 is the bracket member 15.

Secured to a shaft by means of a suitable pin is the bevelled gear 20.

Engaging with the bevelled gear 20 is a second bevelled gear 54, which is suitably keyed or pinned upon the horizontal shaft 55, which is rotatably mounted in the boxing 56', which boxing forms part of the bracket 15. Upon the outer end of the horizontal shaft 55 is keyed the bevelled gear 56, which in turn meshes with the bevelled gear 57 keyed or pinned to the upper end of the vertical shaft 58, the lower end of which is similarly connected by means of bevelled gears 59 and 60 with the horizontal shaft 61. The horizontal shaft 61 is cut in two at the point 62, see Fig. 2, thus forming the two parts 63 and 64. Upon the shaft 63 is splined the shifting portion of the positive clutch 65, which is formed with the circumferential groove 66, in which is mounted a suitable collar 67 carried upon the arms 68, see Fig. 1, which arms are in turn integrally formed with the collar 69 slidably mounted upon the shaft 63. The sliding clutch 65 is formed upon its end with the usual clutch teeth 70, which in turn mesh with similar teeth 71, which are formed upon the adjacent end of the sleeve 72, which is loosely mounted for rotation on the shaft 64. Upon the other end of the sleeve 72 is a flange 73 provided at intervals around its circumference with slots 74 within which slots fit a plurality of projections 75 formed upon the exterior of the friction disc flange 76, which in turn is integral with the sleeve 77, also loosely mounted for rotation upon the shaft 64.

At a suitable distance from the end of the friction disc 76, suitably keyed or pinned to the shaft 64, is a second friction disc 78, which is provided with the annular sockets 79 and 80, within which are tightly mounted the fibrous friction pads 81 and 82. Within the cavity 83 of the sleeve 72 and keyed or pinned to the shaft 64 is a collar 84 and between which collar and the inner end of the sleeve 77, and encircling the shaft 64 is a coil spring 85, the function of which is to continually press the outer face of the friction disc 76 against the friction block or pad 81, the purpose of which will later appear.

Bearing against the face of the friction block 82, is the face 86 of the brake casting 87, which brake casting is formed with the collar 88 loosely mounted upon the shaft 64. Depending from the lower side of the brake casting is the extension or flange 89, which is secured by rivets or otherwise to the yoke 90, which yoke is integral at its other end with the collar 69. Also secured to the yoke 90 by means of the perforated ear 91 is a coil spring 92, which as seen in Fig. 1 is secured at its other end to a suitable projection 93 on the inside of the frame-work of the stand or table 1. Suitably pivoted to the opposite end of the yoke 90 is a connecting rod 94, which at its opposite end is secured to the lower end of the rocker plate 95, which rocker plate is in turn pivoted at 96 to the lower portion of the upright support. Also pivoted to the rocker plate and at the outer end thereof is the vertical rod 97, which carries upon its upper end the handle 98. The upper end of the rod adjacent the handle 98 is mounted for suitable movement in a slot provided in the casting 20', which casting is also suitably secured to the upright standard 4. At the lower end of said slot and joining therewith is a lateral recess in which the bent portion 101 adjacent the handle 98 will be placed when it is desired to lock the driving mechanism in operative position. At the lower end of the rod 97 is a spring whose tendency is to rotate this rod to turn arm 101 into a notch extending from the slot in casting 20' to hold the parts in an operative position. As shown, the connecting rod 94 may be readily operated either with the hand or the foot.

In the construction of the slip clutch, between the faces of the block 81 and the disc 76, it is to be noted that the flange 73 is held from disengagement with the friction disc 78, by virtue of the fact that at suitable intervals around this friction disc are mounted inwardly extending lugs 102, which are bolted or otherwise suitably secured to the flange 103 of the friction disc 78. This construction permits the flanged end of the clutch sleeve 72 to rotate adjacent to the friction block 81, but yet prevents it from being entirely pulled away therefrom.

Figure 2:
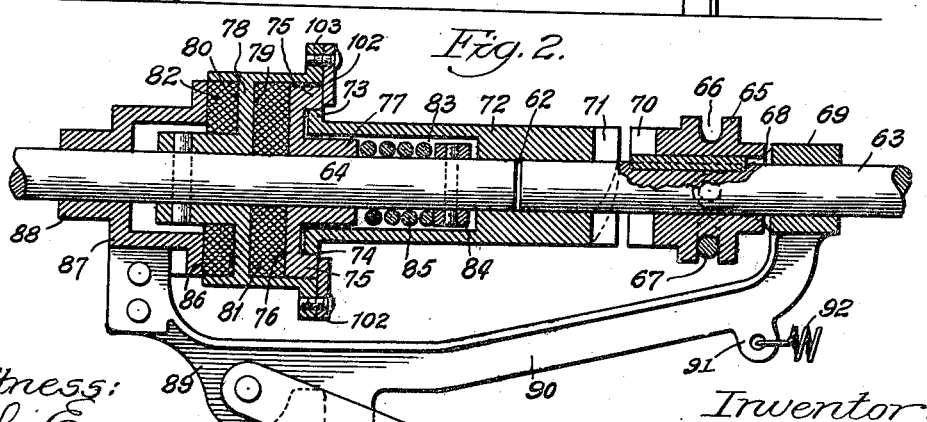
Fig. 2 is a sectional detail view of the clutch mechanism for driving the extractor, and which is located underneath the stand as shown in Fig. 1.

Attention is here called to the fact that in the structure shown in Fig. 2, the slidable driving portion 65 of the positive clutch is secured to one end of the yoke 90, while the brake device 87 is rigidly secured to the other end of this same yoke 90. It will thus be readily apparent that by this construction it will be impossible to throw both the brake and the positive clutch into operative position at the same time, and when the positive clutch is out of operative engagement, the brake 87 will be automatically thrown into engagement with the friction block 82, by the action of the spring 92 in exerting a pull on the end of the yoke 90. By this arrangement of the driving clutch, the brake will automatically engage its respective friction block immediately upon release of the positive driving clutch and thus stop the rotation of the extractor 48 within a very short time without any further attention on the part of the operator.

Upon the end of the shaft 63, remote from the clutch 65, is mounted a bevelled gear 106, which is in turn driven by the bevelled gear 107 mounted on the drive shaft 12. By this arrangement, rotation is transmitted to the shaft 63.

One of the important features of my invention resides in the fact that when the positive clutch 65 is thrown into engagement with its sleeve 72, there will be no sudden jar in the mechanism due to the sudden picking up of the load of the extractor drum 48. This is brought about by the fact that when the clutch 65 is thrown in operative position the friction disc 76, which is resiliently held by means of the spring 85 against the face of the friction block 81, will at first slip over the face of this friction block, and as a result of the pressure of the spring 85 will gradually pick up the load, thus preventing any sudden jars or shocks due to an abrupt starting of the extractor. Should the extractor mechanism or any of the parts become disarranged in any manner and suddenly stopped, this slip clutch will again come into play, and thus in an obvious manner prevent any of the parts of the mechanism from becoming broken or disarranged.

Having now described my invention, I claim:—

1. In apparatus of the class described, driving mechanism comprising a driving shaft, a driven shaft, a positive clutch comprising a driving part slidably but non-rotatably connected to said driving shaft and a driven part loosely mounted on said driven shaft, a friction disc fixed to said driven shaft and engaging the end of said driven part of said positive clutch, and a spring surrounding the driven shaft and holding the driven part of the positive clutch in engagement with the friction disc.

2. In apparatus of the class described, driving mechanism comprising a composite shaft formed of two separate parts in alinement end to end, a positive clutch on one of said parts, and a slip clutch on the other, operatively connected to said positive clutch, whereby the load in starting will be picked up gradually, and resilient means enclosed within the clutch parts and normally tending to hold the parts of the slip clutch in engagement.

3. In apparatus of the class described, driving mechanism comprising a composite shaft formed of two separate parts in alinement end to end, a positive clutch on one of said parts, and a slip clutch on the other, operatively connected to said positive clutch, whereby the load in starting will be picked up gradually, and a brake on said second part for automatically stopping the load.

4. In apparatus of the class described, driving mechanism comprising a composite shaft formed of two separate parts in alinement end to end, a positive clutch on one of said parts, and a slip clutch on the other, operatively connected to said positive clutch, whereby the load in starting will be picked up gradually, a brake, and means to positively prevent said brake and said positive clutch from being in operative position at the same time.

5. In apparatus of the class described, driving mechanism comprising a driving shaft, a driven shaft, a positive clutch comprising a driving part splined to said driving shaft and a driven part loosely mounted on said driven shaft, a friction disc fixed to said driven shaft, a second friction disc loosely mounted on said driven shaft and in engagement to be driven by said driven part of said positive clutch, and means for resiliently pressing said friction discs together.

6. In apparatus of the class described, driving mechanism comprising a composite shaft formed of two separate parts in alinement end to end, a positive clutch on one of said parts, and a slip clutch on the other, operatively connected to said positive clutch, whereby the load in starting will be picked up gradually, a brake, and means to positively prevent said brake and said positive clutch from being in operative position at the same time, and means for normally holding said brake in, and said positive clutch out, of operative position.

7. In apparatus of the class described, a shaft adapted to support a perforate drum, and means for rotating said shaft comprising a slip device whereby the rotating means will not receive the full shock of said drum in starting, and an automatic brake for stopping said drum when the driving connection is disconnected.

8. In apparatus of the class described, a shaft, means for rotating said shaft including a slip clutch and a positive clutch, and an automatic brake for stopping the rotation of said shaft when the positive clutch is disconnected.

9. In apparatus of the class described, a shaft adapted to support a perforate drum, means for rotating said shaft including a slip clutch and a positive clutch, and an automatic brake for stopping said drum when the positive clutch is disconnected, and means whereby it will be impossible to place said brake and said positive clutch in operative position at the same time.

10. In apparatus of the class described, a shaft, means for rotating said shaft comprising a slip clutch and a positive clutch, and an automatic brake for stopping the rotation of said shaft when the positive clutch is disconnected, and a yoke rigidly connecting said positive clutch and said brake, whereby they will move in unison and not be in operative position at the same time.

11. In apparatus of the class described, a shaft, means for rotating said shaft comprising a slip clutch and a positive clutch, an automatic brake for stopping the rotation of said shaft, and a yoke rigidly connecting said positive clutch and said brake whereby they will move in unison and not be in operative position at the same time, and means normally tending to hold said brake in, and said positive clutch out of, operative position.

12. In apparatus of the class described, a shaft, means for rotating said shaft comprising a slip clutch and a positive clutch, an automatic brake for stopping the rotation of said shaft, a yoke rigidly connecting said positive clutch and said brake whereby they will move in unison and not be in operative position at the same time, and means for throwing said positive clutch and said brake into or out of operative position, as desired.

13. In apparatus of the class described, a shaft, a second shaft operatively connected with said first mentioned shaft, means to rotate said second shaft, a positive drive clutch on said second shaft, and a slip clutch on the first shaft, said positive clutch being arranged to drive said slip clutch, whereby to avoid a sudden jar in starting said first named shaft to rotating, an abutment on the first named shaft, and a spring between the abutment and slip clutch to cause said slip clutch to have a constant pressure between the parts thereof tending to cause rotation of the first named shaft when the positive clutch is operative.

In witness whereof, I hereunto subscribe my name to this specification in the presence of two witnesses.

WILLIAM H. VOSS.

Witnesses:
 WILLIAM E. PULS,
 LOUISE A. BREDFELDT.